(12) United States Patent
Willeke et al.

(10) Patent No.: US 8,734,277 B2
(45) Date of Patent: May 27, 2014

(54) HYDRAULIC SYSTEM FOR ACTUATING AT LEAST TWO VALVES

(75) Inventors: Roshan Willeke, Bühl (DE); Volker Edelmann, Bühl/Baden (DE)

(73) Assignee: Schaeffler Technologies GmbH & Co. KG, Herzogenaruach (DE)

( * ) Notice: Subject to any disclaimer, the term of this patent is extended or adjusted under 35 U.S.C. 154(b) by 916 days.

(21) Appl. No.: 12/804,711

(22) Filed: Jul. 27, 2010

(65) Prior Publication Data

US 2011/0039646 A1 Feb. 17, 2011

(30) Foreign Application Priority Data

Jul. 27, 2009 (DE) .......................... 10 2009 034 815

(51) Int. Cl.
*F16H 9/12* (2006.01)
*F16K 31/00* (2006.01)

(52) U.S. Cl.
USPC ........................................ 474/28; 137/624.27

(58) Field of Classification Search
USPC ............ 474/8–29; 137/102, 624.27; 251/102; 477/37–50
See application file for complete search history.

(56) References Cited

U.S. PATENT DOCUMENTS

| 4,052,642 | A | * | 10/1977 | Speth et al. | 318/561 |
| 4,515,041 | A | * | 5/1985 | Frank et al. | 477/43 |
| 4,955,445 | A | * | 9/1990 | Kauss | 180/406 |
| 5,937,729 | A | * | 8/1999 | Spiess et al. | 91/517 |
| 6,338,358 | B1 | * | 1/2002 | Watanabe et al. | 137/102 |
| 6,350,215 | B1 | * | 2/2002 | Gierling | 475/159 |
| 7,029,409 | B2 | * | 4/2006 | Sommer et al. | 474/28 |
| 2003/0060313 | A1 | * | 3/2003 | Sommer et al. | 474/28 |

* cited by examiner

*Primary Examiner* — William E Dondero
*Assistant Examiner* — Robert T Reese
(74) *Attorney, Agent, or Firm* — Alfred J. Mangels

(57) ABSTRACT

A hydraulic system for actuating at least two valves, particularly for actuating a conical-pulley continuously variable transmission of a motor vehicle having a continuously variable transmission ratio (CVT), and with a control valve that controls at least two control valves by controlling total control pressure. Between the control valve and a first valve of at least two valves a cutoff valve is connected, through which the total control pressure provided above a switching threshold can be reduced to minimum control pressure acting at least on the first valve or to zero by means of the control valve.

14 Claims, 4 Drawing Sheets

HYDRAULIC SYSTEM FOR ACTUATING AT LEAST TWO VALVES

BACKGROUND OF THE INVENTION

1. Field of the Invention

The present invention relates to a hydraulic system for actuating at least two valves, particularly for actuating a conical-pulley transmission of a motor vehicle having a continuously variable transmission ratio (CVT) and with at least two valves controlled by means of total control pressure.

2. Description of the Related Art

Hydraulic systems for actuating at least two valves are already familiar. A control valve can be supplied with a constant pilot pressure, whereby the control valve changes the pilot pressure such that the total control pressure acts equally on both valves in order to actuate them. A continuously variable transmission can include an automatically varying transmission. Such a continuously variable automatic transmission includes a starting unit, for example a planetary transmission as a forward/reverse unit, a hydraulic pump, a variable speed drive, an intermediate shaft, and a differential unit. The variable speed drive includes two pairs of pulleys and a transmitting member. Each pair of conical pulleys includes a second conical pulley that can be displaced in the axial direction. The transmitting member, for example a steel thrust belt, a tensioning chain, or a belt, runs between the pairs of conical pulleys. Adjustment of the second pulley changes the running radius of the transmitting member and hence the ratio of the continuously variable automatic transmission.

Stepless automatic transmissions require a high-pressure level to be able to adjust the pulley of the variable speed drive at the desired operating speed and hence transmit the torque more or less freely with a sufficient base clamping pressure. The entire control can result by means of electrical activation that can feature proportional valves, for example actuated electrically, and a pilot pressure feed line that can simultaneously actuate a downstream valve, or if necessary actuate several downstream valves.

An object of the present invention is to provide an improved hydraulic system for actuating at least two valves, particularly to better actuate the two valves despite common control with only one control valve, and particularly to prevent overregulation of at least one of the valves.

SUMMARY OF THE INVENTION

The object of the invention is achieved with a hydraulic system for actuating at least two valves, particularly when controlling a continuously variable conical-pulley transmission (CVT) of a motor vehicle having a continuously variable transmission ratio. The vehicle has a valve that controls at least two valves with total pressure, wherein a cutoff valve is connected between the control valve and a first valve between at least two valves. The total control pressure that can be provided by means of the control valve above a switching threshold can be reduced at least to minimum control pressure, or it can be reduced to zero pressure acting on the first valve. Overregulation of the first valve can be prevented advantageously above the switching threshold. It is conceivable that above the switching threshold, actuation of a second valve occurs between at least two valves, whereby the first valve can be cut off advantageously, or at least can be pressurized by reduced low control pressure so that overregulation does not occur.

In an exemplary embodiment of the hydraulic system, it is possible that the cutoff valve features static transmission behavior equal to one below the switching threshold, between the total control pressure and the low control pressure above the switching threshold, and below a cutoff threshold strong negative static transmission behavior, and above the cutoff threshold the cutoff valve features static transmission behavior equal to zero. A control range of the total control pressure for the downstream cutoff valve can be advantageously subdivided into three regions, whereby in a first region below the switching threshold the cutoff valve is more or less ineffective, therefore the first valve is controllable completely unchanged by means of the control valve. In a second region that lies between the switching threshold and the cutoff threshold, negative transmission behavior arises so that further increase of the total control pressure causes a reduced, low control pressure. Therefore, more or less by means of the cutoff valve a reversal of the transmission behavior, otherwise available, occurs, so that in the second region, in spite of increasing total control pressure, revertive control by the first valve occurs. In a third region that lies above the cutoff threshold, the total control pressure is decreased to zero pressure so that in spite of further activation by means of the control valve and the total control pressure, no actuating pressure acts on the first valve, thus, the latter being deactuated or it can be reset in O-position. Advantageously, in this third region, activation of one or several other valves, for example, the second valve amongst at least two valves can occur; this can feature transmission behavior in the third region. In the first and/or second region, the transmission behavior of the second valve can be designed so that it does not control in spite of the increasing total control pressure, but rather features a transmission behavior of zero, for example, which lies between the switching threshold and the cutoff threshold, particularly above the cutoff threshold, and particularly on the cutoff threshold, transforms into a corresponding control characteristic.

In a further exemplary embodiment of the hydraulic system, it is possible that the cutoff valve is accommodated in a valve plug of the first valve. The cutoff valve can be accommodated advantageously in a normal assembly space for the first valve, so that a previous structural surrounding, particularly the control of the continuously variable conical-pulley transmission must not be changed in order to obtain the advantageous effect of the cutoff valve. Advantageously, only a conventional plug of the first valve must be replaced in the valve plug featuring the cutoff valve.

In a further exemplary embodiment of the hydraulic system, it is provided that the cutoff valve includes a cutoff slide valve that is pressurized by a reset force exerted by a control surface acting oppositely to the reset force that can be pressurized by the total control pressure, whereby the total control pressure above the switching threshold can be reduced, by means of the cutoff slide valve, to at least the minimum control pressure or to zero. The control function of the cutoff valve can be achieved advantageously with only one cutoff slide valve, which is pressurized against the reset force by means of the control surface with total control pressure force. The reset force can be produced in any manner, for example, by means of a return spring assigned to the cutoff slide valve.

In a further exemplary embodiment of the hydraulic system it is provided that the control slide includes a first fluid path, which conveys the total control pressure, without reduction, to the first valve below the switching threshold, which is reduced by means of the control slide to the first valve between the switching threshold and the cutoff threshold and blocked by means of the control slide above the cutoff threshold. Via the first fluid path, the total control pressure can be conveyed further selectively without reduction by means of the control slide or with reduction to the first valve or it can be blocked entirely. The first fluid path can be assigned to a first slide valve or to a corresponding pressure surface for actuating the first valve.

In a further exemplary embodiment of the hydraulic system, it is provided that the control slide and/or the valve plug features a second fluid path assigned to a tank, which can be blocked by means of the cutoff slide valve below the switching threshold. Between the switching threshold and the cutoff threshold it can be expanded by means of the cutoff slide valve in the direction of the first fluid path assigned to the first valve, whereby, at the same time, the first fluid path can be reduced by means of the cutoff slide valve in the direction of the control valve, and above the cutoff threshold by means of the cutoff slide valve in the direction of the first fluid path, it can be switched fully to the tank, whereby, at the same time, the first fluid path in the direction of the control slide can be blocked. Advantageously, the second fluid path can be switched selectively by means of the cutoff slide valve of the first valve to the tank, whereby, at the same time, the total control pressure is separated from the first valve, or vice versa.

In a further exemplary embodiment of the hydraulic system, it is possible that the cutoff slide valve and/or the valve plug includes a third fluid path by means of which further control pressure can be conveyed to a further hydraulic component. A further hydraulic component can also be actuated advantageously by means of the control valves via the cutoff valve in that manner.

In a further exemplary embodiment of the hydraulic system, it is possible that the third fluid path below a feed threshold is closed by means of the cutoff slide valve and is switched through, above a feed threshold. Advantageously, the feed threshold can be identical with the switching threshold or with the cutoff threshold, particularly it may lie between these two, so that, by means of the cutoff valve, a sectional subdivision of the total control pressures is possible for different hydraulic components, whereby actuation of a first hydraulic component, for instance of the first valve above a switching threshold or, if applicable, of the cutoff threshold, no longer occurs, whereby a further hydraulic component assigned to the third fluid path does not experience actuation until the feed threshold is attained, thus it only reacts to further rise of the total control pressure above a feed threshold.

The object of the present invention is also achieved by a CVT-transmission having a hydraulic system in accordance with one of the preceding exemplary embodiments. The advantages described above are thereby gained.

The object of the present invention is further achieved by a motor vehicle having the above-described CVT-transmission. The advantages described above are thereby gained.

BRIEF DESCRIPTION OF THE DRAWINGS

Further advantages, features and details are derived from the following description, in which, if applicable, at least one exemplary embodiment is described with reference to the drawing. Described and/or pictorially shown features on their own, or in any arbitrarily reasonable combinations of the object of the invention, if necessary also independently of the claims, and particularly or additionally, can also be the object of one or several separate inventions. Identical, similar, and/or functionally identical parts are provided with the same reference numeral. The drawing figures are as follows:

DESCRIPTION OF THE PREFERRED EMBODIMENTS

Figure 1:
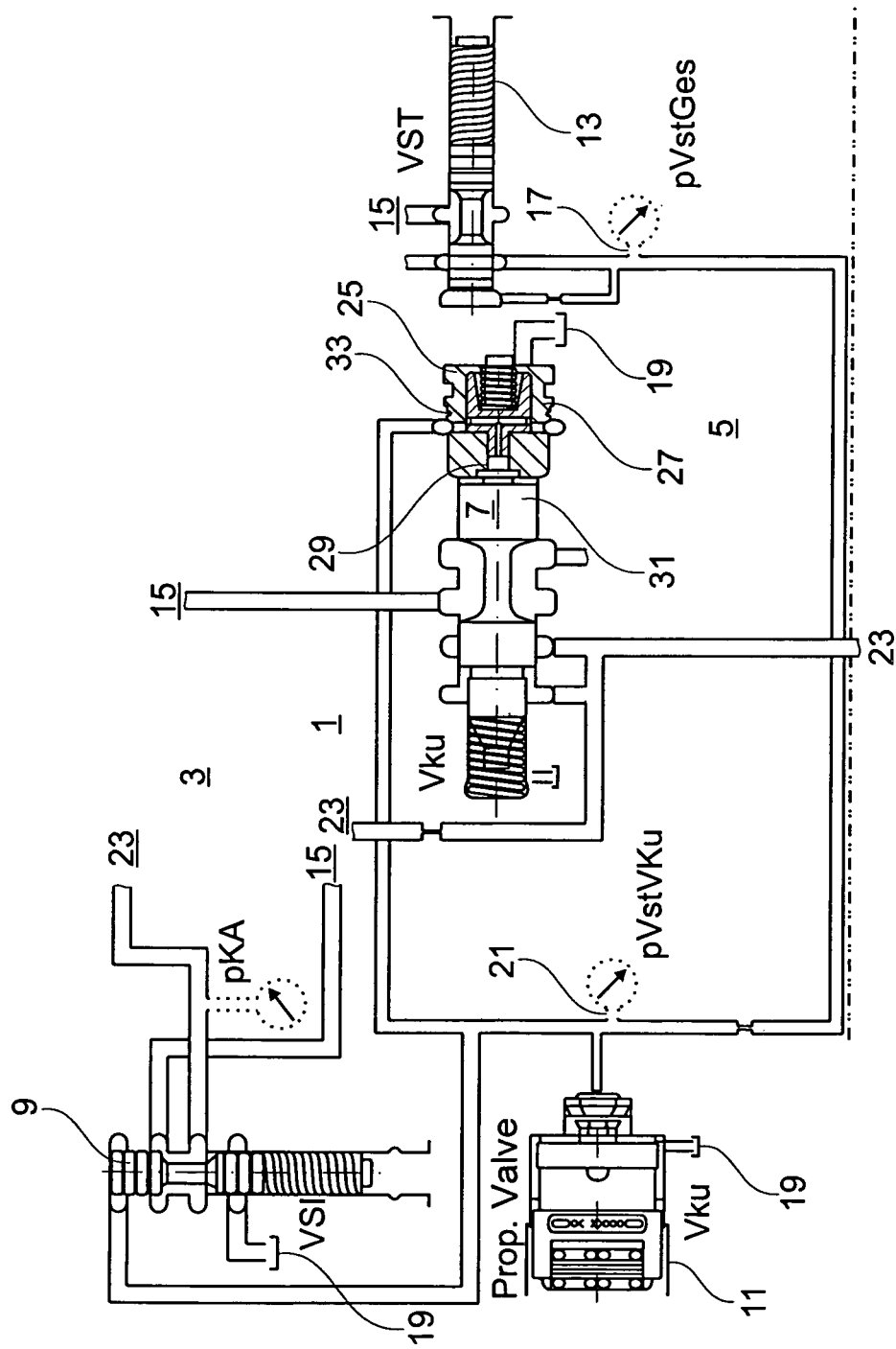
FIG. 1 shows a schematic view of a hydraulic system for actuating two valves.

FIG. 1 shows a schematic view of a hydraulic system 1, which is part of a control arrangement of a conical-pulley continuously variable transmission with the reference numeral 3, only indicated, having a variably adjustable transmission ratio (CVT), of a motor vehicle indicated with the reference numeral 5. The hydraulic system 1 includes a first valve 7 as well as a second valve 9. A control valve 11 is connected upstream of the valves 7 and 9 for combined actuation. The control valve 11 is connected downstream of a pilot pressure valve 13, which reduces system pressure 15 to essentially constant pilot pressure 17. The pilot pressure, for instance, can measure approximately 5 bar. By means of the pilot pressure valve 13, the control valve 11 can be fed with pilot pressure 17. The control valve 11 is an electrically actuated proportional valve, which is connected downstream of an orifice, proportionally to an electric current in a common manner; it switches the pilot pressure 17 to a tank 19 and hence to total control pressure 21, which is conveyed in the direction of the first valve 7 and second valve 9 to actuate them.

The first valve 7 is for controlling a volumetric cooling oil flow to other assemblies 23, for instance, for cooling a clutch of the conical-pulley continuously variable transmission 3. For that purpose, the first valve 7 is connected downstream of a hydraulic power source—not shown in detail—which provides the system pressure 15 and is connected upstream of the assemblies 23.

The second valve 9 involves a safety valve that blocks pressure, if necessary, to one of the assemblies connected downstream or reduces it to zero, whereby the corresponding aggregate can be switched to the tank 19. The second valve 9 can be connected upstream of one or several starting clutches of the conical-pulley continuously variable transmissions 3 for realizing a safety function.

A cutoff valve 25 is connected advantageously between the first valve 7 and the control valve 11, which is accommodated in a valve plug 27 of the first valve 7. The cutoff valve 25 modifies the total control pressure 21 controlled by means of the control valve 11 into minimum control pressure 29. The minimum control pressure 29 lies on a corresponding control surface of a first slide valve 31 of the first valve 7. The first valve 7 can advantageously not be controlled by means of the total control pressures 21, but by means of the minimum control pressures 29 of the cutoff valve 25.

Figure 2:
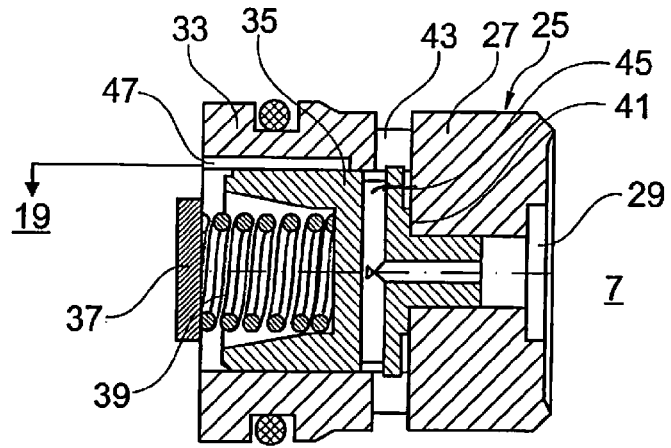
FIG. 2 shows a cutoff valve accommodated in a valve plug of a valve shown in FIG. 1.

FIG. 2 shows a detail view of the valve plug 27 of the cutoff valve 25 shown in FIG. 1. The valve plug 27 includes a plug housing 33 in which a cutoff slide valve 35 is supported movably back-and-forth. The cutoff slide valve 35 is movable back-and-forth against a return force of a return spring 39 striking back-and-forth on tongue 37, supported towards the right, and left-viewed in the alignment direction of FIG. 2.

The cutoff slide valve 35 includes a control surface 41 that can be pressurized by the total control pressure 21. For that purpose, the plug housing 33 includes a feed line 43 via a corresponding feed line disk of a hydraulic plate—not shown in detail—as well as a corresponding fluid path that is connected downstream of the control valve 11. The cutoff slide valve 35 includes a first fluid path 45 that is assigned to the control surface of the slide valve 31 of the first valve 7 or connected upstream if applicable. The first fluid path 45 includes at least a radial bore in fluidic connection with a centric bore, which opens in the direction of the control surface of the slide valve 31. Further, cutoff valve 25, in particular the valve plug 27, includes a second fluid path 47 to which the tank 19 is connected. In the illustration in accordance with FIG. 2, the second fluid path 47 is formed by a groove extending in the longitudinal direction in a cylindrical stepped bore that accommodates the cutoff slide valve 35. The cutoff slide valve includes a form of correspondingly stepped cylindrical bore, whereby the control surface 41 includes an additional step so that the total control pressure 21 can better act against the spring force of the return spring 39.

Figure 7:
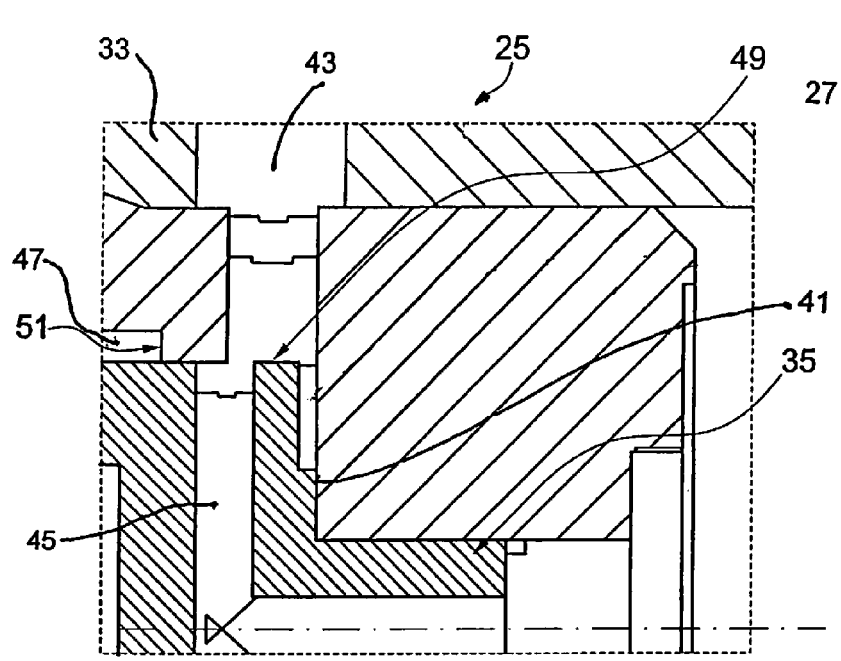
FIG. 7 shows a detail view of a cutoff slide valve with a control edge of the cutoff valve shown in FIG. 6.

FIG. 7 shows a detail view of the control surface 41 of the cutoff slide valve 35 in the section of the feed line 43 and of the first fluid path 45. It can be seen that the cutoff slide valve 35 includes a first control edge 49, by means of which the first fluid path 45 can be blocked. In a first functional position shown in FIG. 7, the cutoff valve 25 is not at all pressurized, or is only pressurized by low pressure, whereby the cutoff slide valve 35 contacts the limit stop on the right in correspondence with the return force of the return spring 39 in the stepped bore of the plug housing 33, viewed in the alignment of FIG. 7. In that case, the first control edge 49 is open, whereby the feed line 43 is connected with the first fluid path 45. As can be seen in FIG. 7, the cutoff slide valve 35 includes a second control edge 51 disposed opposite the first control edge 49, by means of which the second fluid path 47 can be blocked selectively or can be assigned to the first fluid path 45.

Figure 5:
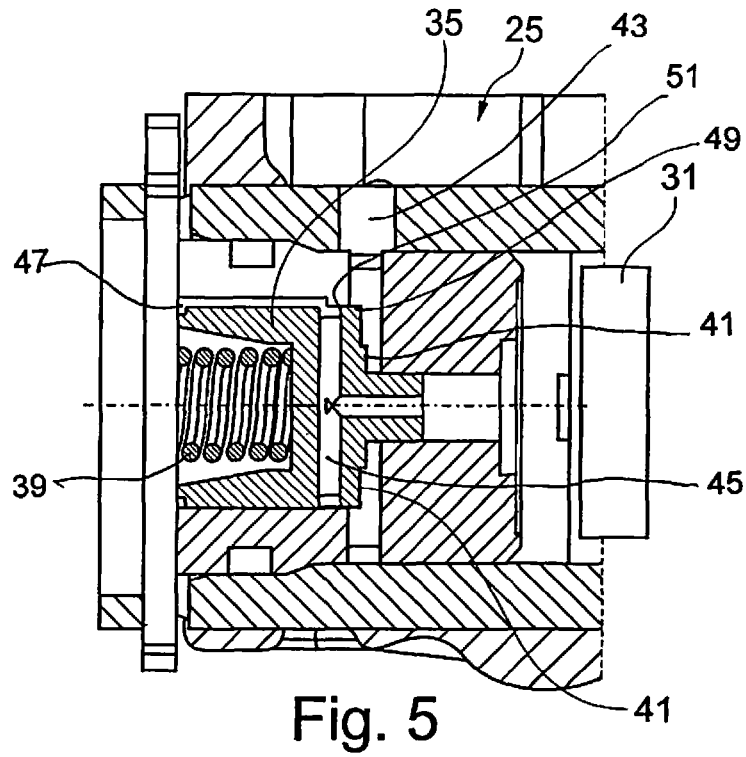
FIGS. 5, 6 show the cutoff valve shown in FIG. 1 together with the partially shown first valve in two different functional positions.
Figure 6:
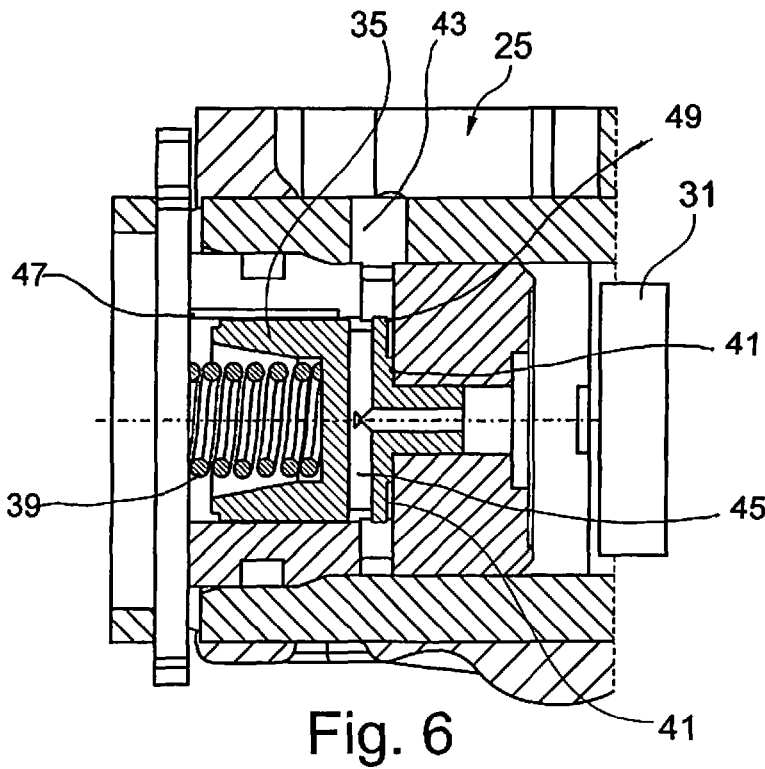

FIGS. 5 and 6 show different functional positions of the cutoff valve 25 shown in FIGS. 2 and 7. FIG. 6 shows the functional position shown in FIG. 7, whereby, by means of the first control edge 49 of the cutoff slide valve 35, the feed line 43 is assigned to the first fluid path 45, whereby the total control pressure 21 is switched to the first valve 7 without reduction. With the increasing total control pressure 21, the pressure force on the control surface 41 also increases, so that the cutoff slide valve 35 increasingly moves to the left, viewed in the direction of FIGS. 5 and 6, so that the first control edge 49 closes fluid access to first slide valve 31, and upon further pressure increase the second control edge 51 opens fluid access to second fluid path 47. Thus, the functional position that corresponds to maximum total control pressure 21 is shown in FIG. 5. As such, the first fluid path 45 in the direction of the feed line 43 is closed, and in the direction of the second fluid path 47, thus in the direction of the tank 19, is fully open, whereby the first valve 7 is pressureless. Additionally, a further functional position of the cutoff slide valve 35 exists, which lies between the functional positions shown in FIGS. 5 and 6. In that case, both the first control edge 49 as well as the second control edge 51 are in a control position, so that a throttled fluid can flow equally through both, whereby a control equilibrium is established between pressure surfaces of the cutoff slide valve 35 and the counteracting force of the return spring 39, which, in that region, causes a negative characteristic, and thus the minimum control pressure 29 drops upon further increase of the total control pressure 21. This control region ends as soon as the first control edge 49 is fully closed, so that through the already slightly opened second control edge 51 the pressure in the first fluid path 45 can drop to the tank pressure, thus to zero bar pressure. Further increase beyond this limit causes no change of the minimum control pressure 29, since the latter remains switched to the tank via the second control edge 51. This functional position is visible in FIG. 5.

Figure 8:
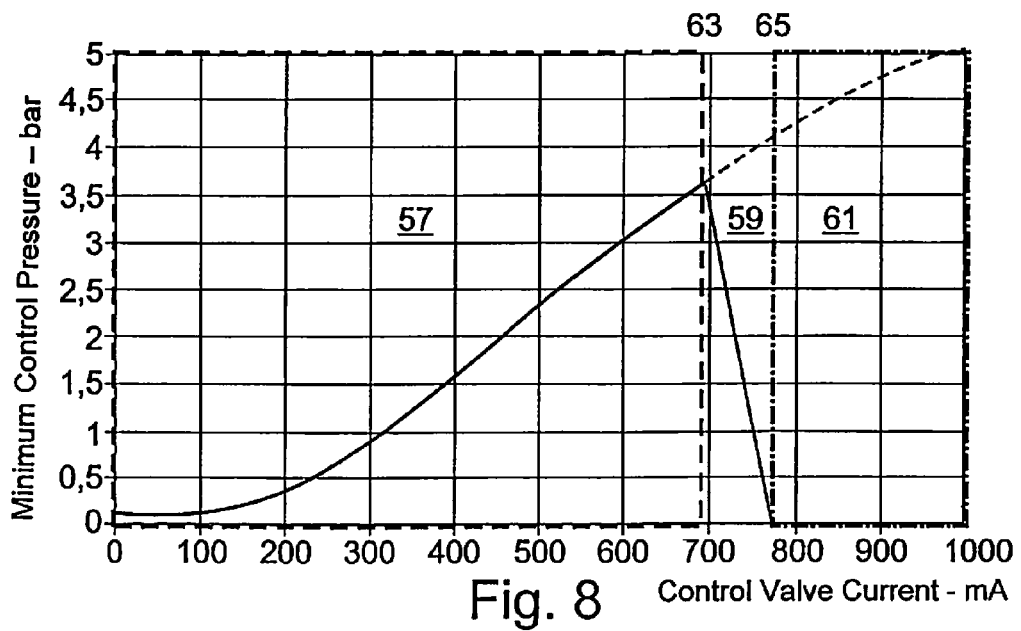
FIG. 8 shows a graph of a transmission characteristic of the cutoff valve shown in FIGS. 1, 5, and 6.

FIG. 8 shows an exemplary transmission behavior of the hydraulic system for the control valve 11 and the first valve 7 shown in FIG. 1. An input signal of the control valve 11, for instance a current in mA of the control valve 11, is shown on the x-axis. The current of the control valve 11 in mA is proportional to the total control pressure 21 set by means of the control valve 11. The minimum control pressure 29 acting on the first fluid path 45 or on the slide valve 31 of the first valve 7, if applicable, is plotted on the y-axis. A first control region 57 of the cutoff valve 25 is drawn in the diagram of FIG. 8 by means of a dashed rectangle. A third control region 61 is symbolized by means of a second dash-dotted rectangle. Between the first control region 57 and the third control region 61, the transmission behavior of the cutoff valve 25 includes a second control region 59. In the first control region 57, the minimum control pressure 29 corresponds to the total control pressure 21, as it is provided also to the second valve 9 for controlling a corresponding slide valve of the second valve 9. Above a switching threshold, which for instance corresponds to 700 mA current of the control valve 11, the second control edge 51 begins to open, and accordingly the flow cross section at the first control edge 59 begins to reduce. It is apparent that at the switching threshold 63 the transmission behavior of the cutoff valve 25 transforms from a positive characteristic with a transmission behavior of one to a characteristic with a disproportionately negative behavior. Over the entire second region 59, the minimum control pressure 29 drops linearly upon further rise of total control pressure 21, or upon a further rise of current, up to a cutoff threshold 65 that, for instance, can lie at 770 mA. Upon reaching the cutoff threshold 65, flow past the first control edge 49 is closed and flow past the second control edge 51 is fully open, so that the first valve 7 is fully switched to the tank 19, whereby, despite the presence of the total control pressure 21, the minimum control pressure 29 drops to zero bar, thus the tank pressure. This state is implemented over the entire third control region 61, and thus, in this third control region 61, the cutoff valve 25 includes zero transmission behavior.

Figure 3:
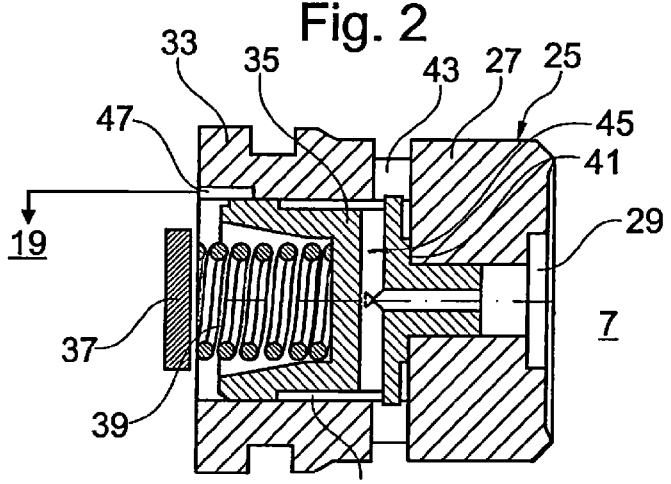
FIG. 3 shows a further valve plug with a cutoff valve.

FIG. 3 shows a further exemplary embodiment of a valve plug 27 of a cutoff valve 25. The difference is that the second fluid path is formed by a radially surrounding groove 67 of the cutoff slide valve 35 and the longitudinal groove 47, shown in FIG. 2, inside the bore of plug housing 33. The surrounding groove 67 includes the second control edge 51 that opens in the second switch position, in the direction of the longitudinal groove, thus in the direction of the tank 19.

Figure 4:
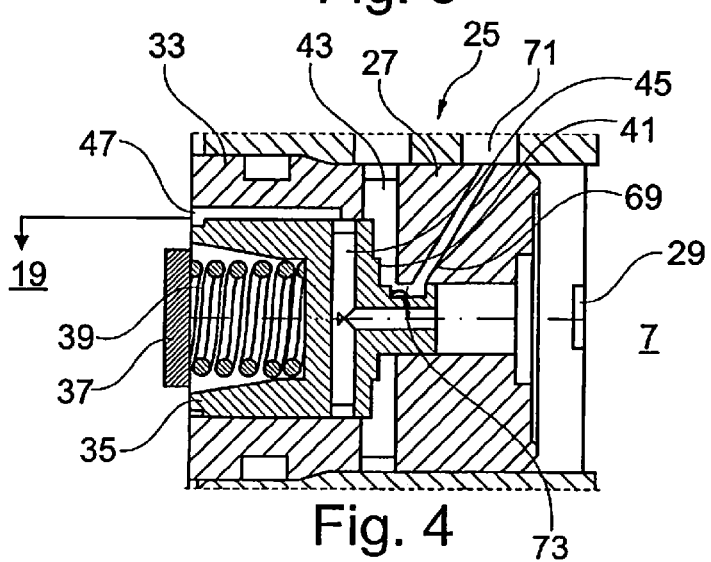
FIG. 4 shows a further valve plug with a cutoff valve.

FIG. 4 shows a further exemplary embodiment of a plug housing 33 of a cutoff valve 35. The difference is that the cutoff slide valve 35 and the plug housing 33 include a third fluid path 69, which is formed by a groove running in the longitudinal direction on the smallest diameter of the cutoff slide valve 35, as well as an inclined bore of the plug housing 33 running radially. The third fluid path 69 converges into an outlet 71, or to a corresponding disk that can be connected upstream of a further valve—not shown in detail—or hydraulic component, for instance, for the supply of hydraulic medium and/or for activation. The third fluid path 69 can be opened or closed selectively by means of a third control edge 73. In that case, the third control edge 73 is disposed such that it opens the feed line 43 in the direction of the third fluid path 69 upon reaching a feed threshold, or upon reaching a corresponding total control pressure 21 value. The third control edge 73, for instance, can be designed such that it then opens when the first control edge 49 is fully closed. It is therefore possible to disconnect the other hydraulic component—not shown in detail—that can be assigned to the outlet 71, at total control pressure 21, which is below the feed threshold, from the control valve 11 and supply it with total control pressure 21 above a feed threshold.

The first valve 7 and the second valve 9 can advantageously be actuated equally by the common control valve 11. In that manner, it is possible to advantageously actuate the first valve 7 in the first control region 57 shown in FIG. 8, or to connect it to the latter and actuate the second valve 9 in the third control region 61. In the second control region 59, both valves 7 and 9 can be actuated equally. It is possible to connect the second control region 59 as closely as possible so that it disappears and the switching threshold 63 and the cutoff threshold 65 coincide.

Advantageously, it can be ensured that the first valve 7 is also not overregulated for a comparatively high total control pressure 21, for instance, above 3.6 bar, at which the second valve 9 is actuated, but on the contrary, the second control region 59 and the third control region 61 are connected pressureless. That can be used advantageously in case the first valve 7 provides a cooling oil flow for a clutch of the conical-pulley continuously variable transmission 3, whereby a very high viscous friction owing to very high cooling oil delivery flow can be prevented advantageously, particularly if the respective hydraulic medium is at a low temperature. In an ideal case, the first valve 7 should only be actuated in the first region 57, which can be realized advantageously by interposing the cutoff valve 25 also for activation of the second valve 9. Very high frictional torque caused by too much cooling oil above a cutoff threshold, which would be the case without the cutoff valve 25, and hence an undesired too high viscous friction or a frictional torque associated with it can advantageously be avoided. Further, the characteristic of the total control pressure 21 of the control valve 11 is drawn by means of a dashed line in FIG. 8, as featured on the second valve 9. The above-described transmission behavior between the control valve 11 and the cutoff valve 25 is drawn with the three control regions 57 to 61 by means of a continuous line in FIG. 8.

The cutoff valve 25 can advantageously be realized in a modified valve plug or in the valve plug 27. Upon attaining the selectable switching threshold 63, the valve plug 27 blocks total control pressure 21 that would otherwise act on the slide valve 31 of the first valve 7 on the tank 19 and, at the same time, blocks the feed line 43 in the direction of the control valve 11. The valve plug 27 includes the plug housing 33 fixed by the tongue 37 or by the retaining tongue inside the bore of the valve plug 27, the spring-loaded cutoff slide valve or the inner piston and the return spring 39 supported on the tongue 37 or the compression spring. The valve plug 27 is fed via the feed line 43 connected to the disk and inside the control plate—not shown in detail—of the hydraulic system 1, which converges into a groove forming the first fluid path 45 of the valve plug 27.

In the non-switched state as shown in FIG. 6, the valve plug 27 allows pilot oil at the total control pressures 21 into the slide valve 31 so far, with the transmission behavior 1. If the total control pressure of the control valve 11 attains a threshold value, or the switching threshold 63, which depends upon two diameters of the cutoff slide valve 35 and the return force of the return spring 39, the cutoff slide valve 35 switches the feed line to the first valve 7 or the first fluid path 45 to the tank 19 and blocks a pilot circuit of the control valve 11, which includes the total control pressure 21.

Before the first control edge 49 closes the first fluid path 45, a total circular area of the cutoff slide valve 35 represents the working area. As soon as the first fluid path 45 is fully blocked, only a ring surface of the stage of the cutoff slide valve 35 still works, which can then further traverse the cutoff slide valve 35 for the third control region 61.

When the cutoff slide valve 35 is at the first control edge 49, it will work as a pressure controller with a falling characteristic in accordance with the second control region 59 until the pressure on the ring surface of the cutoff slide valve is sufficient to push it beyond the first control edge 49 and subsequently to open it towards the tank.

In FIG. 8, the control valve 11 is shown by means of a current or by means of an electric valve current, compared with the shape of the total control pressure 21 without the cutoff valve 25 (dashed) compared with the shape of minimum control pressure 29, which occurs after the cutoff valve 25, thus at the feed line of the first valve 7. In the second control region 59 between 700 and 770 mA, the cutoff valve 25 proportionally regulates the total control pressure 21 to the minimum control pressure 29 with a falling characteristic. Upon attaining the third control region 61 the slide valve 31 of the first valve 7 detects zero bar pressure, independently of a further current of the control valve 11, which corresponds to zero transmission behavior. By means of the surrounding groove 67, the groove shown in FIG. 3, and a corresponding shorter longitudinal groove, the flow resistance to the tank 19 can be reduced advantageously since an increase of cross-section is achieved.

As shown in FIG. 4, instead of the feed line 43 being fully blocked by means of the third control edge 73 in the switched state, it can be diverted to the outlet 71.

In summary, the first valve 7 as a valve that can be switched off by means of the cutoff valve 25 can be realized without serious change of a valve casing of the hydraulic system 1. Advantageously, this function is achieved by means of the cutoff valve 25 integrated in the modified valve plug 27, whereby, from a preset value or from the switching threshold 63, the total control pressure 21 is switched to the tank 19 in the direction of the slide valve 31 of the first valve 7, and at the same time the pilot pressure feed line or the feed line 43 of the control valve 11 can be blocked. Advantageously, the valve plug 27 is provided, which, as from a selected pressure threshold value or as from the switching threshold 63, can block, limit, and/or divert the feed line pressure or the total control pressure 21 to the slide valve 31 of the first valve 7.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A hydraulic system for actuating at least two valves for controlling a conical-pulley continuously variable transmission of a motor vehicle, the transmission having a variably adjustable transmission ratio (CVT), said hydraulic system comprising: a pilot pressure valve for reducing a hydraulic system pressure provided by a hydraulic pump; a control valve connected downstream of the pilot pressure valve for receiving the pilot pressure and for providing as an output a total control pressure to at least two valves, wherein the control valve controls the at least two valves by adjusting the total control pressure; and a cutoff valve connected between the control valve and a first valve of the at least two valves, and by which cutoff valve the total control pressure that is above a switching threshold and that is adjustable by the control valve, can be reduced to a minimum control pressure that acts on the first valve.

2. The hydraulic system in accordance with claim 1, wherein below the switching threshold the cutoff valve provides a static transmission behavior of one between the total control pressure and the minimum control pressure, and above the switching threshold and below a cutoff threshold the cutoff valve provides a strongly negative static transmission behavior, and above the cutoff threshold the cutoff valve provides a static transmission behavior of zero.

3. The hydraulic system in accordance with one claim 1, wherein the cutoff valve is accommodated in a valve plug of the first valve.

4. The hydraulic system in accordance with claim 1, wherein the cutoff valve includes a cutoff slide valve pressurized by a return force with a cutoff slide valve control surface that is pressurized and that provides a force that acts against the return force, which cutoff slide valve control surface can be pressurized by the total control pressure, and wherein the total control pressure above the switching threshold can be reduced by the cutoff slide valve to at least the minimum control pressure.

5. The hydraulic system in accordance with claim 4, wherein the cutoff slide valve includes a first fluid path that conveys the total control pressure to the first valve without reduction below the switching threshold, and between the switching threshold and a cutoff threshold it the cutoff slide valve conveys the total control pressure with reduction to the first valve, and above the cutoff threshold the cutoff slide valve blocks the total control pressure.

6. The hydraulic system in accordance with claim 1, wherein the cutoff valve includes a third fluid path that can be conveyed further by means of a feed pilot pressure to a further hydraulic component.

7. The hydraulic system in accordance with claim 6, wherein the third fluid path below a feed threshold is closed by means of the cutoff slide valve and is open above the feed threshold.

8. A conical-pulley continuously variable transmission of a motor vehicle having a continuously variable transmission ratio (CVT), including a hydraulic system in accordance with claim 1.

9. A motor vehicle having a conical-pulley continuously variable transmission in accordance with claim 8.

10. A hydraulic system for actuating at least two valves for controlling a conical-pulley continuously variable transmission of a motor vehicle having a variably adjustable transmission ratio (CVT), said hydraulic system comprising: a control valve that controls at least two valves through a total control pressure; and a cutoff valve connected between the control valve and a first valve of the at least two valves, and by which cutoff valve the total control pressure that is above a switching threshold and that is adjustable by the control valve can be reduced on the first valve to at least a minimum control pressure, wherein the cutoff valve includes a cutoff slide valve pressurized by a return force and having a control surface acting against the return force, which control surface can be pressurized by the total control pressure, whereby the total control pressure above the switching threshold can be reduced by the cutoff slide valve to at least the minimum control pressure, wherein the cutoff slide valve includes a second fluid path assigned to the tank, wherein the second fluid path can be blocked below the switching threshold by the cutoff slide valve; wherein between the switching threshold and a cutoff threshold the second fluid path can be extended by means of the cutoff slide valve in the direction of a first fluid path assigned to the first valve, wherein at the same time the first fluid path can be reduced by the cutoff slide valve in the direction of the control valve, and above the cutoff threshold it can be switched fully to the tank by means of the cutoff slide valve in the direction of the first fluid path, and wherein at the same time the first fluid path is blocked in the direction of the control valve.

11. A hydraulic system for actuating at least two valves for controlling a conical-pulley continuously variable transmission of a motor vehicle, the transmission having a variably adjustable transmission ratio (CVT), said hydraulic system comprising:
a pilot pressure valve for reducing a hydraulic system pressure provided by a hydraulic pump;
an electrically operated control valve connected downstream of the pilot pressure valve for receiving the pilot pressure and for providing as an output a total control pressure to at least two valves, wherein the control valve controls the at least two valves by adjusting the total control pressure;
and a cutoff valve connected between the control valve and a first valve of the at least two valves, and by which cutoff valve the total control pressure that is above a switching threshold value of control valve current and that is adjustable by the control valve, can be reduced to a minimum control pressure that acts on the first valve;
wherein in a first control region a minimum control pressure provided by the control valve increases with increasing control valve current up to the switching threshold value of the control valve current;
wherein in a second control region the minimum control pressure decreases to zero with increasing control valve current from the switching threshold value to a cutoff threshold value of the control valve current; and
wherein in a third control region the minimum control pressure is zero with increasing control valve current above the cutoff threshold value.

12. The hydraulic system in accordance with claim 11, wherein in the second control region the minimum control pressure decrease from the switching threshold value of the control valve current to the cutoff value of the control value current is linear.

13. The hydraulic system in accordance with claim 11, wherein in the first control region both the first and second valves are actuated.

14. The hydraulic system in accordance with claim 11, wherein in the third control region the first valve is actuated to divert hydraulic fluid to a tank.

* * * * *